(12) United States Patent

Faccin

(10) Patent No.: US 8,260,296 B2
(45) Date of Patent: Sep. 4, 2012

(54) SYSTEM AND METHOD FOR PROACTIVE, EARLY NETWORK SWITCHING

(75) Inventor: Stefano Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 1033 days.

(21) Appl. No.: 11/284,990

(22) Filed: Nov. 22, 2005

(65) Prior Publication Data

US 2006/0135165 A1    Jun. 22, 2006

Related U.S. Application Data

(60) Provisional application No. 60/629,988, filed on Nov. 22, 2004.

(51) Int. Cl.
*H04W 36/00*    (2009.01)
(52) U.S. Cl. ......... 455/436; 455/437; 455/438; 455/439
(58) Field of Classification Search .......... 455/436–439
See application file for complete search history.

(56) References Cited

U.S. PATENT DOCUMENTS

| | | | |
|---|---|---|---|
| 6,611,547 B1* | 8/2003 | Rauhala | 370/331 |
| 2003/0086395 A1* | 5/2003 | Shanbhag | 370/331 |
| 2004/0081119 A1 | 4/2004 | Zhong et al. | |
| 2004/0196809 A1* | 10/2004 | Dillinger et al. | 370/331 |
| 2004/0224690 A1* | 11/2004 | Choi et al. | 455/436 |
| 2004/0246917 A1* | 12/2004 | Cheng et al. | 370/328 |

FOREIGN PATENT DOCUMENTS

| | | |
|---|---|---|
| EP | 1 094 647 | 4/2001 |
| EP | 1 441 469 | 7/2004 |

\* cited by examiner

*Primary Examiner* — Dwayne Bost
*Assistant Examiner* — Yungsang Lau
(74) *Attorney, Agent, or Firm* — Alston & Bird LLP

(57) ABSTRACT

A mobile terminal for reduction of data loss during transitioning of the mobile terminal between network devices includes a controller. The controller is capable of transmitting a request to transition and receiving queued data from an original network device prior to transition from the original network device to a target network device. The queued data is content data intended for and undelivered to the mobile terminal that is temporarily stored at the original network device from a time when the request to transition is transmitted to when the transition occurs. The controller is also capable of transitioning from the original network device to the target network device and receiving data stored at the target network device responsive to the request to transition following transition from the original network device to the target network device.

19 Claims, 8 Drawing Sheets

SYSTEM AND METHOD FOR PROACTIVE, EARLY NETWORK SWITCHING

CROSS-REFERENCE TO RELATED APPLICATIONS

The present application claims priority to U.S. Provisional Application No. 60/629,988, entitled "Proactive Early Network Switching", filed Nov. 22, 2004, the contents of which are incorporated herein in their entirety.

FIELD OF THE INVENTION

Embodiments of the present invention relate generally to wireless technology and, more particularly, relate to enabling a mobile terminal to proactively switch access points without losing data.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to switching between access points within a network. For example, a wireless local area network (Wireless LAN) typically comprises multiple access points and mobile terminals. Each mobile terminal communicates with an access point using wireless transmissions. The access point is typically attached to some fixed network such as a wired LAN although such fixed network might be implemented in many ways including more wireless links. For purposes of this description, consider the example of an Ethernet LAN.

Data originating from a mobile terminal passes wirelessly to an access point and may then be further transmitted by the access point to a third party device that is accessible through the wired LAN. Similarly data originating from such a third party device, and addressed to the mobile terminal, will be delivered to the access point, which will then transmit the data wirelessly to the mobile terminal. Such a system works reliably so long as the access point and mobile terminal have effective wireless communications.

As stated above, networks often include multiple access points. Additionally, it is often desirable for a mobile terminal to have the ability to switch between access points such as in instances in which the location of the mobile terminal has moved such that the mobile terminal can more effectively communicate with a different access point than the initial access point with which the mobile terminal previously communicated. As such, when a mobile terminal desires to switch from a first access point to a second access point, for example, in which both first and second access points are connected to the same LAN, the mobile terminal may elect to use the second access point for its communication and cease to use the first access point. Such a transition may be accomplished using various signaling methods. Following the transition, data will be sent from the mobile terminal to the second access point for further transmission to the third party device and data arriving from the third party device will be transmitted to the mobile terminal from the second access point.

It is currently common for problems to arise during the transition from the first access point to the second access point. For example, during normal operation, data arriving from the third party device may be delivered to the first access point which does not or cannot transmit such data to the mobile terminal immediately, but, which instead, stores the data until a later, and perhaps more convenient, time. This storage or other delay in transmission by the first access point may cause problems when the mobile terminal transitions to a second access point. In this regard, at the point of transition, the mobile terminal informs the second access point to start forwarding any messages from the third party device so that the second access point will start to accept data from the LAN in preparation for transmission. At this time the mobile terminal will be waiting to receive data from the second access point. However, a problem occurs where the first access point has stored data in preparation for transmission to the mobile terminal, but the mobile terminal transitions to the second access point before the first access point starts to send the data. In such a case the data will not be delivered to the mobile terminal and will instead be lost.

While data lost during a transition between access points can be retransmitted in a manner suitable for some applications, other applications, such as voice over IP and video streaming which are not tolerant to lost data. In conjunction with voice and video data, for example, lost data usually results in aberrations in the sound or picture quality. Thus, a need exists for reducing, if not eliminating, data that would otherwise be lost while transitioning between access points.

BRIEF SUMMARY OF THE INVENTION

A system is therefore provided which allows for advance notification of a second access point that a transition is about to take place so that the second access point may collect and store data for the mobile terminal while the mobile terminal retrieves remaining data from the first access point. A method for avoiding lost data during transition is also provided which includes a mobile terminal notifying a second access point of imminent transition, the mobile terminal retrieving all remaining data from the first access point, and the mobile terminal transitioning to the second access point and retrieving new data from said second access point. Thus, the mobile terminal may switch access points without losing data during the transition.

According to an exemplary embodiment, a mobile terminal for reduction of data loss during transitioning of the mobile terminal between network devices is provided. The mobile terminal includes a controller that is capable of transmitting a request to transition and receiving queued data from an original network device prior to transition from the original network device to a target network device. The queued data is content data intended for and undelivered to the mobile terminal that is temporarily stored at the original network device from a time when the request to transition is transmitted to when the transition occurs. The controller is also capable of transitioning from the original network device to the target network device and receiving data stored at the target network device following transition.

According to an exemplary embodiment, a method for reduction of data loss during transitioning between network devices is provided. The method includes transmitting a request to transition to at least one of an original network device and a target network device, receiving queued data from the original network device following transmission of the request to transition, transitioning the mobile terminal from the original network device to the target network device following receipt of the queued data, and receiving data stored at the target network device responsive to the request to transition following transition of the mobile terminal from the original network device to the target network device. The queued data is content data intended for the mobile terminal that is temporarily stored at the network device from a time when the request to transition is transmitted to when the transition occurs.

According to an exemplary embodiment, a computer program product for reduction of data loss during transitioning of a mobile terminal between network devices is provided. The computer program product includes at least one computer-readable storage medium having computer-readable program code portions stored therein. The computer-readable program code portions include first, second, third and fourth executable portions. The first executable portion transmits a request to transition. The second executable portion receives queued data from an original network device prior to transition from the original network device to a target network device. The third executable portion transitions from the original network device to the target network device. The fourth executable portion receives data stored at the target network device responsive to the request to transition following transition from the original network device to the target network device. The queued data is content data intended for and undelivered to the mobile terminal that is temporarily stored at the original network device from a time when the request to transition is transmitted to when the transition occurs.

According to an exemplary embodiment, a computer program product for reduction of data loss during transitioning of a mobile terminal between network devices is provided. The computer program product includes at least one computer-readable storage medium having computer-readable program code portions stored therein. The computer-readable program code portions include first, second, third, fourth and fifth executable portions. The first executable portion is for receiving a request to transition from the mobile terminal. The second executable portion is for relaying the request to transition to a network device. The third executable portion is for transmitting queued data previously received from the network device to the mobile terminal responsive to the request to transition. The fourth executable portion is for storing new data from the network device responsive to the request to transition. The fifth executable portion is for delivering the stored new data to the mobile terminal following delivery of the queued data.

According to an exemplary embodiment, a network device for reduction of data loss during transitioning of a mobile terminal between network access points is provided. The network device is capable of receiving and relaying a request to transition from the mobile terminal and transmitting queued data intended for the network device and received prior to receiving the request to transition to the mobile terminal responsive to the request to transition. The network device is further capable of storing data received subsequent to receiving the request to transition and delivering the stored data to the mobile terminal following transitioning.

Embodiments of the invention provide a mobile terminal, network device, computer program product and method for conducting proactive, early network switching of a mobile terminal. As a result, data is not lost during transition of the mobile terminal and data transfer between the mobile terminal and third party devices may be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 7:
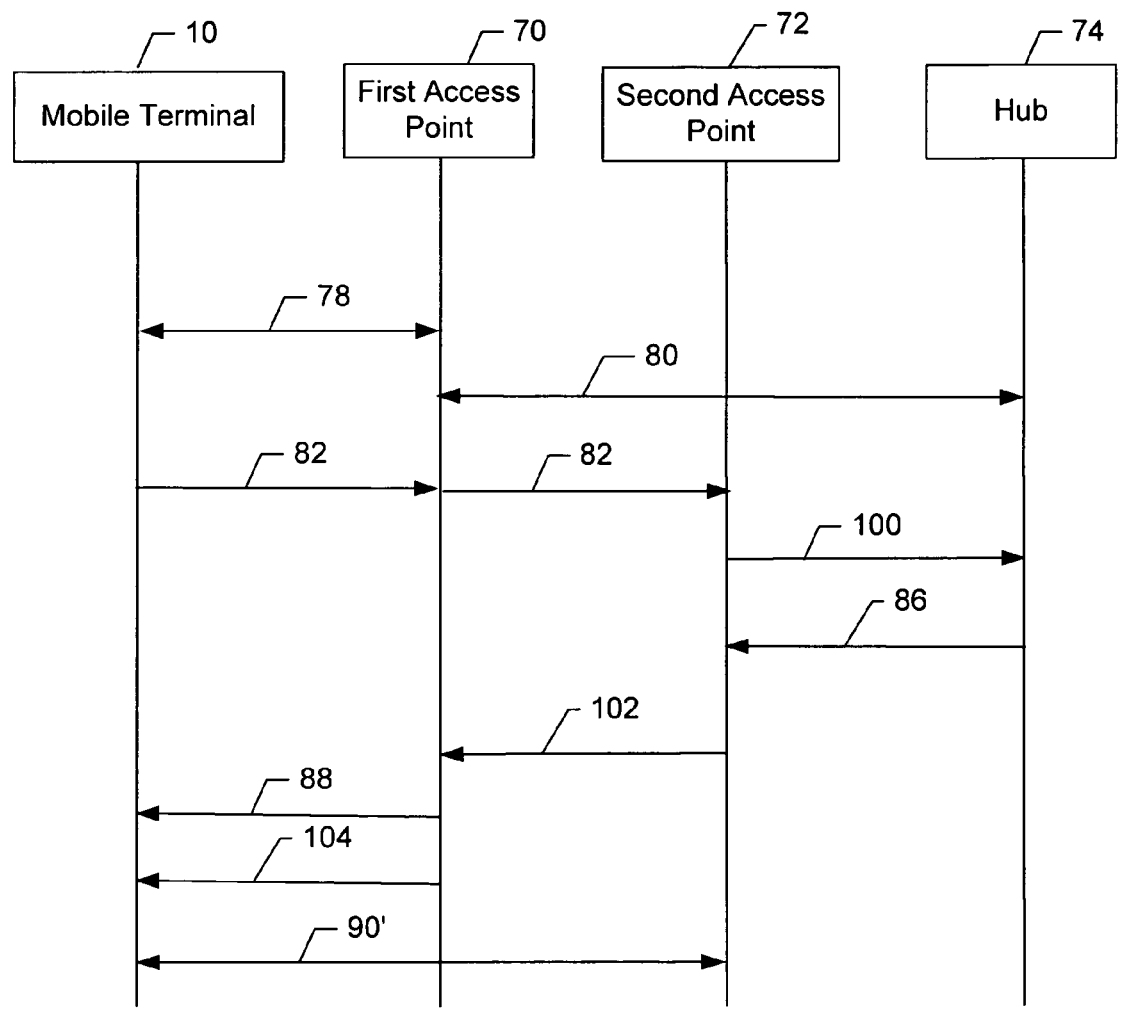
Figure 8:
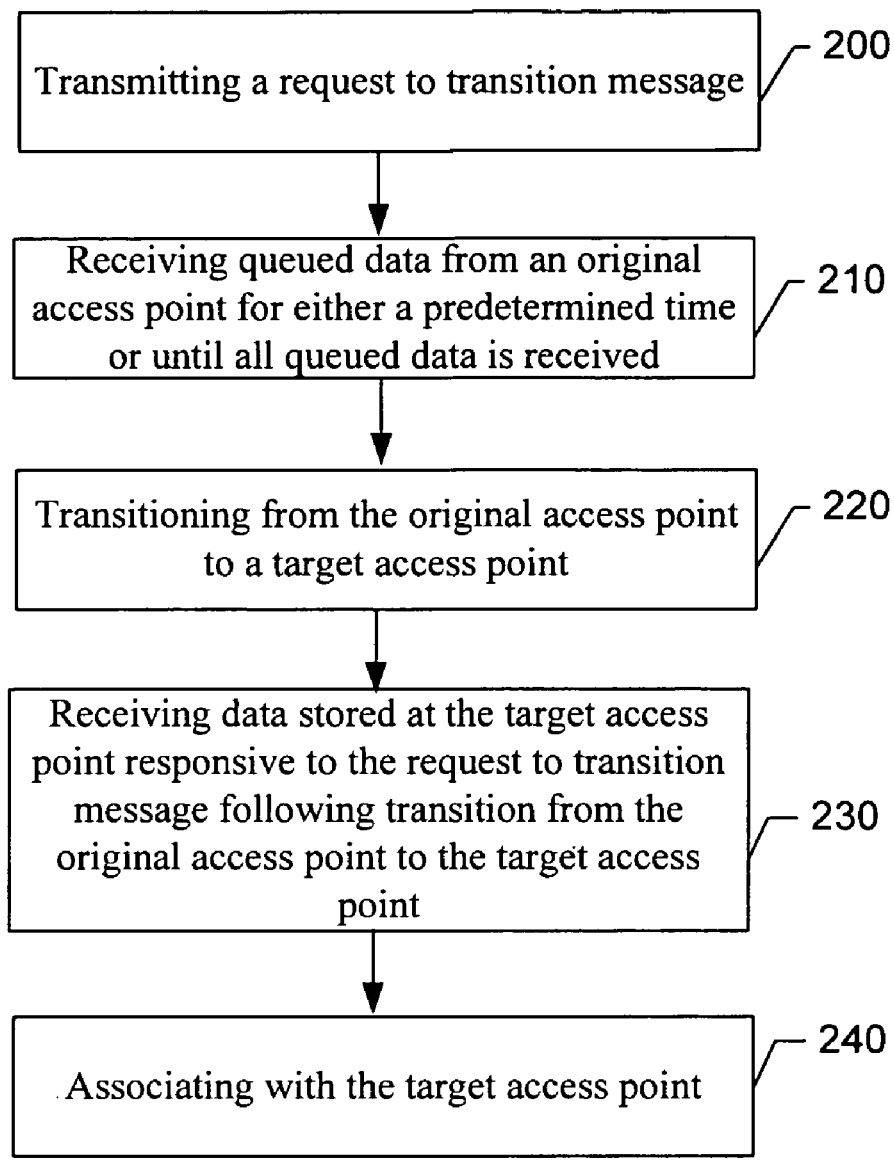

FIG. 7 illustrates a control flow diagram illustrating a method of reduction of data loss during switching association of a mobile terminal between network access points according to still another exemplary embodiment of the present invention; and FIG. 8 is a block diagram according to an exemplary method of reduction of data loss during switching association of a mobile terminal between network access points.

DETAILED DESCRIPTION OF THE INVENTION

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout.

Figure 1:
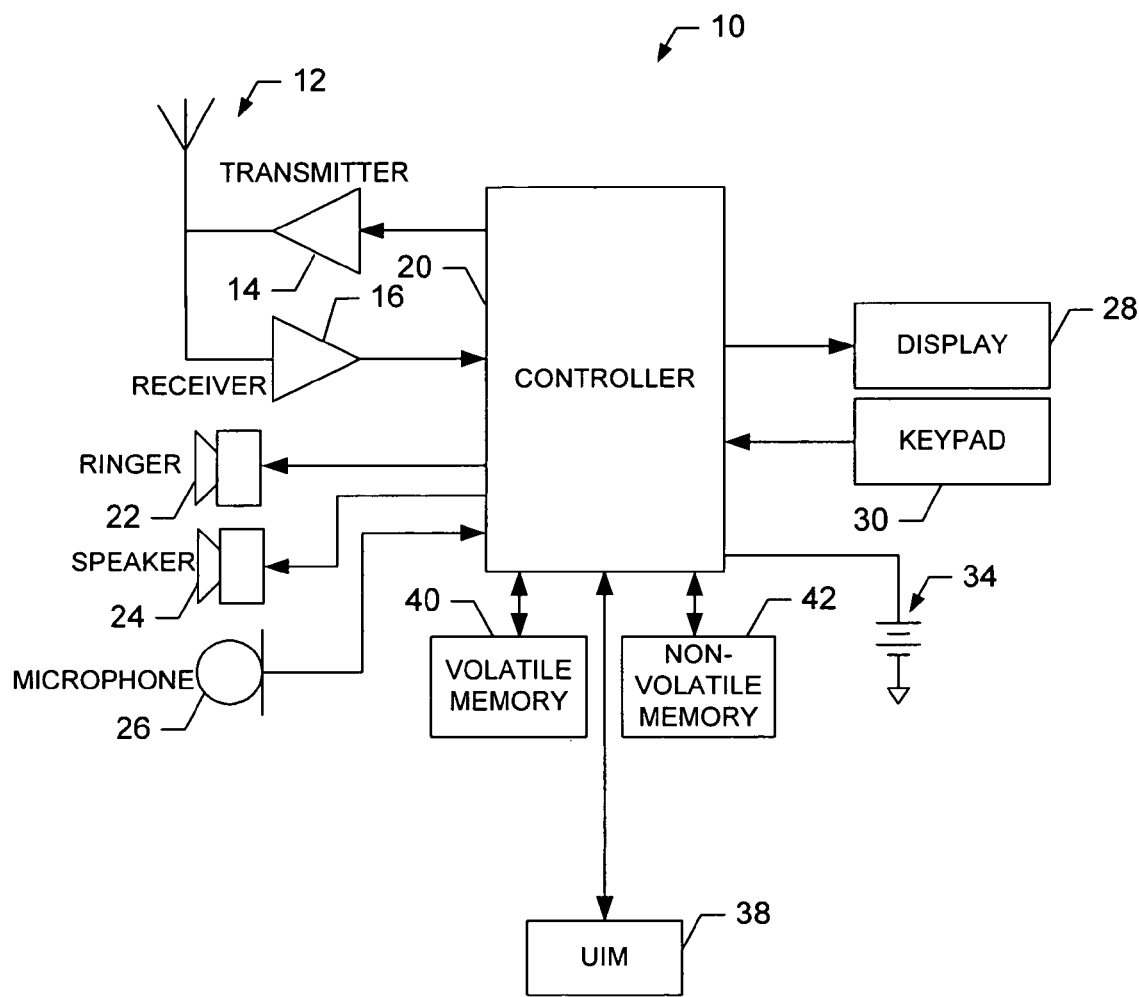
FIG. 1 is a schematic block diagram of a mobile terminal according to an exemplary embodiment of the present invention.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, laptop computers and other types of voice and text communications systems, can readily employ the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. More particularly, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example. Also, for example, the controller 20 may be capable of operating a software application capable of creating an authorization for delivery of location information regarding the mobile terminal 10, in accordance with embodiments of the present invention (described below).

The mobile terminal 10 also comprises a user interface including a conventional earphone or speaker 22, a ringer 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 includes the conventional numeric (0-9) and related keys (#, *), and other keys used for operating the mobile terminal 10. The mobile terminal 10 further includes a battery 34, such as a vibrating battery pack, for powering various circuits that are required to operate the mobile terminal 10, as well as optionally providing mechanical vibration as a detectable output. The mobile terminal 10 may further include a universal identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
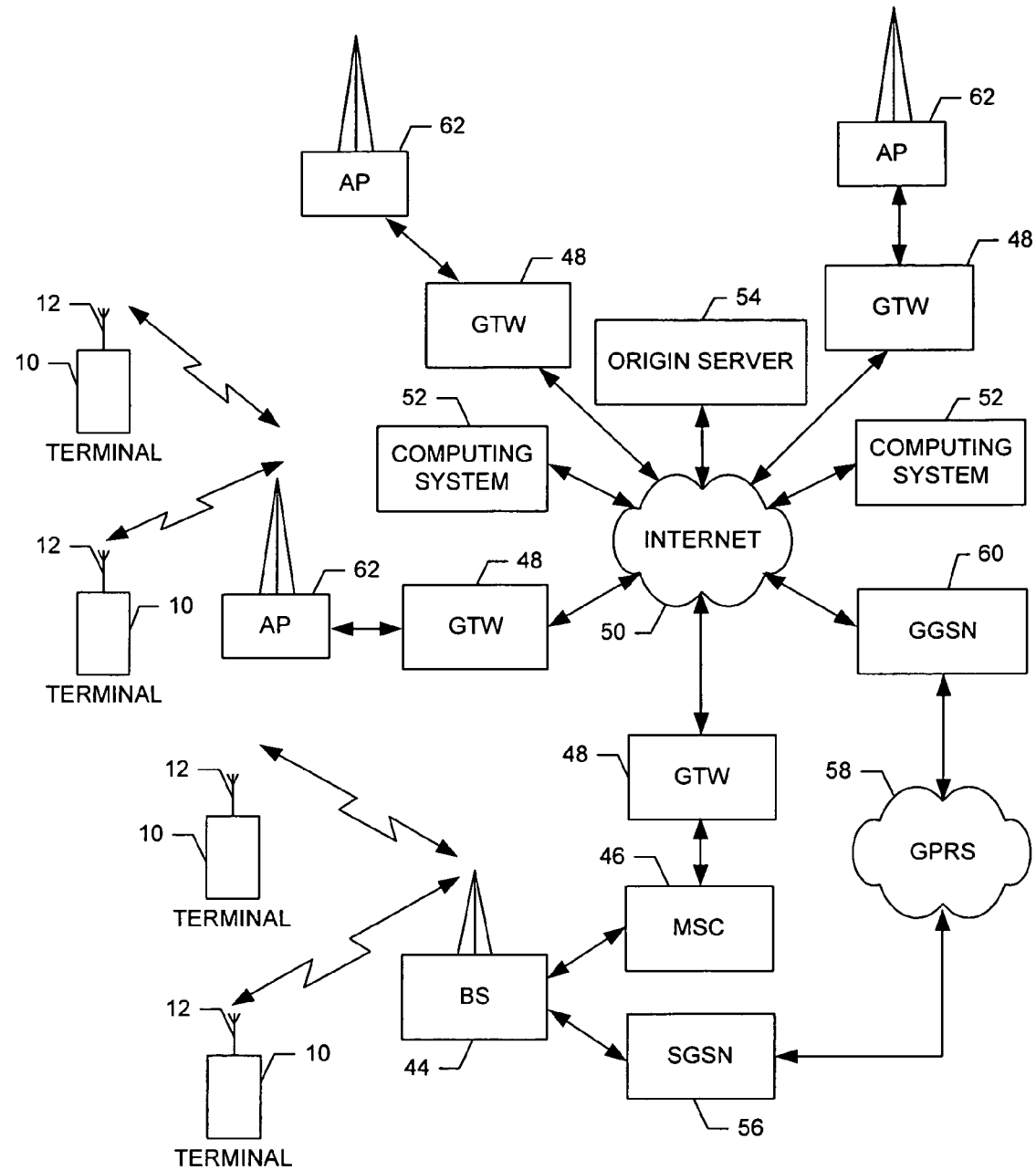
FIG. 2 is a schematic block diagram of a wireless communications system according to an exemplary embodiment of the present invention.

Referring now to FIG. 2, an illustration of one type of system that would benefit from the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
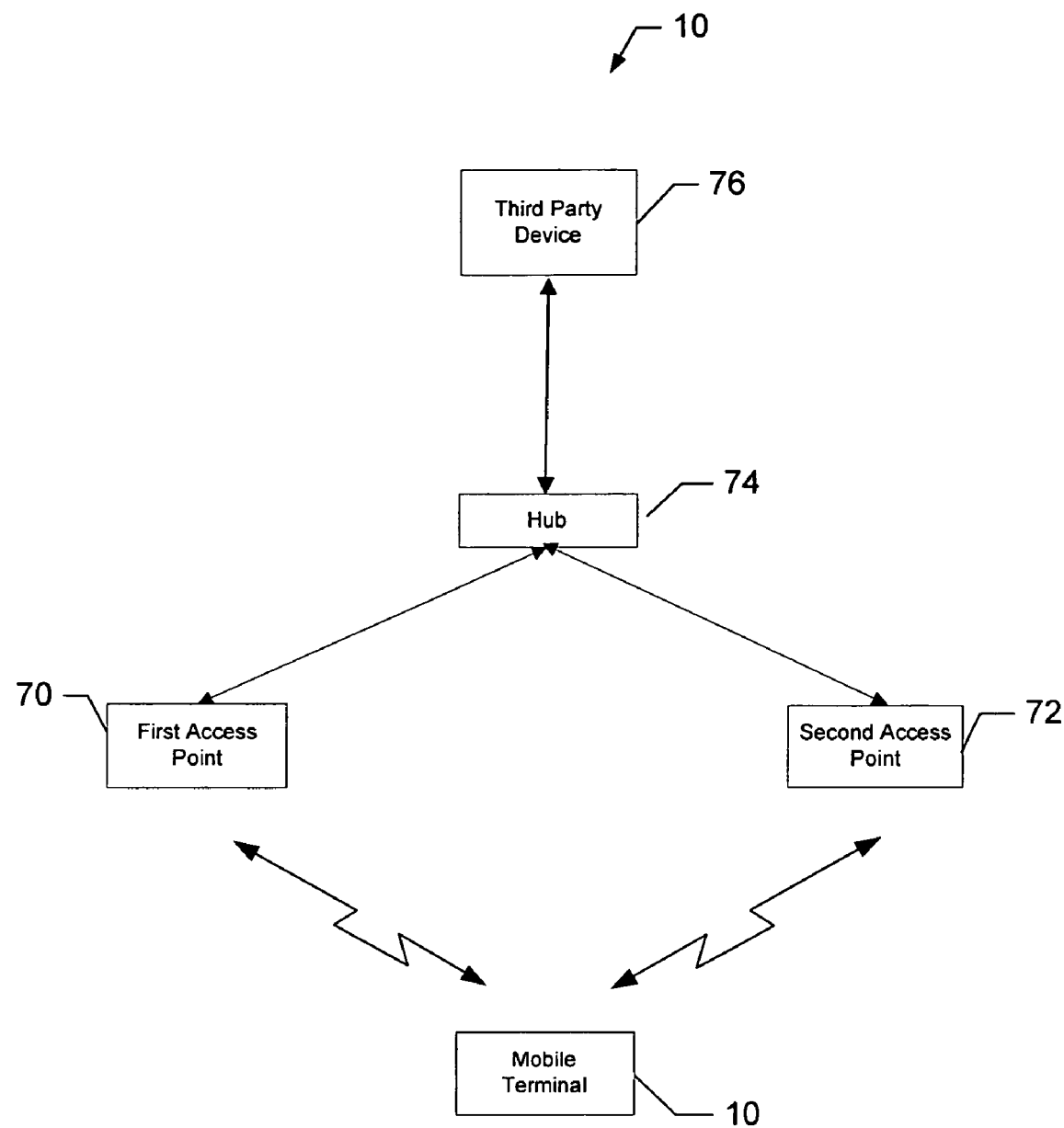
FIG. 3 illustrates a schematic block diagram of a simplified wireless communications system according to an exemplary embodiment of the present invention.

Reference is now made to FIG. 3, which illustrates a simplified network topology in accordance with an exemplary embodiment of the present invention. According to this exemplary embodiment, the mobile terminal 10 is capable of wireless communication with either a first access point 70 or a second access point 72, although many other access points will generally exist in many implementations. It will be understood that the mobile terminal 10 is associated with, or in continuous communication with only one of the first and second access points 70 and 72 at any given time. Each of the first and second access points 70 and 72 are capable of communication with a common network hub 74. The hub 74 may be, for example, the internet 50, a hard wired network, a gateway device controlling access to the MSC 46, a wired network, or any device that enables access points to communicate with each other and any third party devices. The hub 74 is in communication with a third party device 76 from/to which the mobile terminal 10 desires to receive/send data. The third party device may be, for example, a network server, a computing system, another mobile terminal, etc.

For purposes of explanation, it will be assumed that the mobile terminal 10 is initially in wireless communication with the third party device 76 via the first access point 70 and that the mobile terminal 10 intends to transfer to communication with the third party device 76 via the second access point 72. Accordingly, the first access point 70 acts as an original access point and the second access point 72 acts as a target access point. It is noted that as used herein, original access point merely indicates that the first access point 70 was used by the mobile terminal 10 prior to the transition to the second access point 72 and not necessarily that the first access point 70 was the very initial access point with which the mobile terminal 10 communicated, e.g. the first access point 70 could have been a target access point in a prior transition. When in continuous communication with one of the first and second access points 70 and 72, the mobile terminal 10 is considered to be associated with the respective one of the first and second access points 70 and 72. Furthermore, it will be understood that although FIGS. 3-7 show only two access points, any number of additional access points may also be included in an exemplary system in accordance with an embodiment of the present invention. Referring now to FIGS. 3-7, transfer of association between the first and second access points 70 and 72 will be described.

Figure 4:
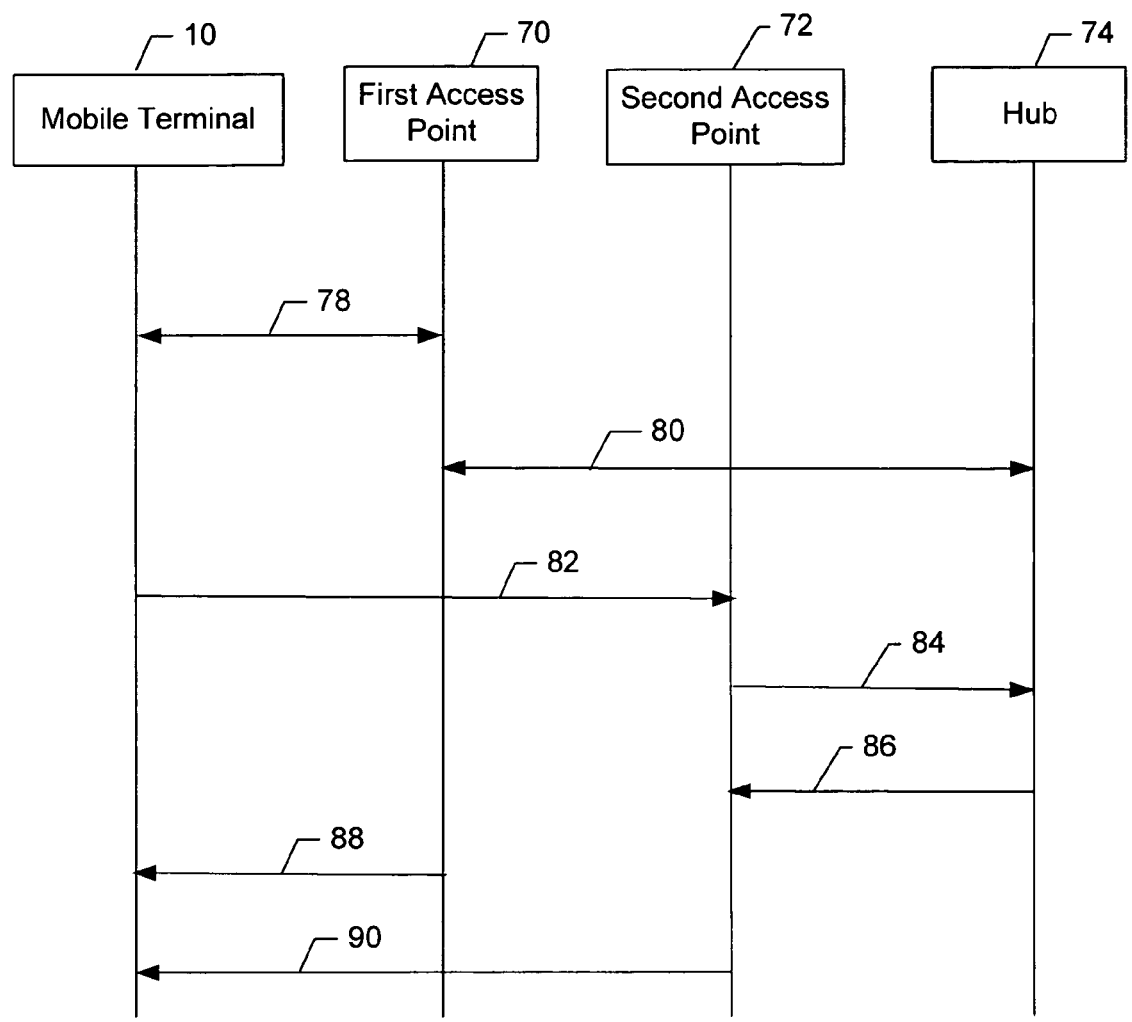
FIG. 4 illustrates a control flow diagram illustrating a method of reduction of data loss during switching association of a mobile terminal between network access points according to an exemplary embodiment of the present invention.

In an exemplary embodiment as shown in FIG. 4, the mobile terminal 10 initially exchanges wireless data 78 with the first access point 70. The first access point 70 then exchanges data messages 80 with the hub 74 which may in turn, exchange messages with the third party device 76. In instances in which it is determined that the mobile terminal 10 should now be serviced by the second access point 72, the mobile terminal 10 communicates an intention to transfer message 82 via a wireless message to the second access point 72. The determination that the mobile terminal should be serviced by the second access point 72 may be made in any number of manners known to those skilled in the art. For example, such determination may be either manually or automatically implemented. Furthermore, is such determination is automatically implemented, an automatic determination may be based upon such factors as signal quality or signal strength, for example.

Upon receiving the intention to transfer message 82, the second access point 72 then sends a message 84 to the hub 74, to inform the hub 74 to begin diverting data from the third party device 76 to the second access point 72. The message 84 may include, for example, a dummy frame. The hub 74, then begins directing data intended for the mobile terminal 10 to the second access point 72 as indicated by arrow 86. However, although the mobile terminal 10 terminates transmissions to the first access point 70, the mobile terminal 10 remains in communication with the first access point 70 for a period of time to ensure all data previously sent from the third party device 76 to the mobile terminal 10 via the first access point 70 ("queued data") has been delivered to the mobile terminal 10 as indicated by arrow 88. Alternatively, the mobile terminal 10 may wait a predetermined amount of time after sending the intention to transfer message 82 according to specific policies programmed in the mobile terminal 10, and then transitions to the second access point 72. The length of the period of time following the intention to transfer message 82 that the mobile terminal 10 remains in communication with the first access point 70 is typically set to be sufficiently long such that all queued data will be transferred from the first access point 70 to the mobile terminal 10. During the time which the mobile terminal 10 remains in communication with the first access point 70, the second access point 72 stores new data that arrives from the hub 74, which is intended for the mobile terminal 10. After the mobile terminal 10 has waited the predetermined amount of time or received all data sent from the third party device 76 to the mobile terminal 10 via the first access point 70, the mobile terminal 10 transitions to the second access point 72 and so notifies the second access point 72. After transitioning, the second access point 72 delivers all stored data and any new data that arrives to the mobile terminal 10 as indicated by arrow 90. By receiving the queued data from the first access point 70 even after the intention to transfer message 82 prior to beginning to receive data from the second access point 72, the mobile terminal 10 receives all of the data and no data is lost.

As used herein, queued data refers to content data received at the first access point 70 prior to transitioning and not delivered to the mobile terminal 10 until after receipt of the intention to transfer message 82. In other words, the queued data is content data that is temporarily stored in a queue at the first access point 70, which upon receipt of the intention to transfer message 82 is intended for and undelivered to the mobile terminal 10. It should be noted that although in the above described exemplary embodiment no data is received at the first access point 70 following receipt of the intention to transfer message 82, in an alternative embodiment, any data received at the first access point 70 following receipt of the intention to transfer message 82 would also be temporarily stored as queued data.

Figure 5:
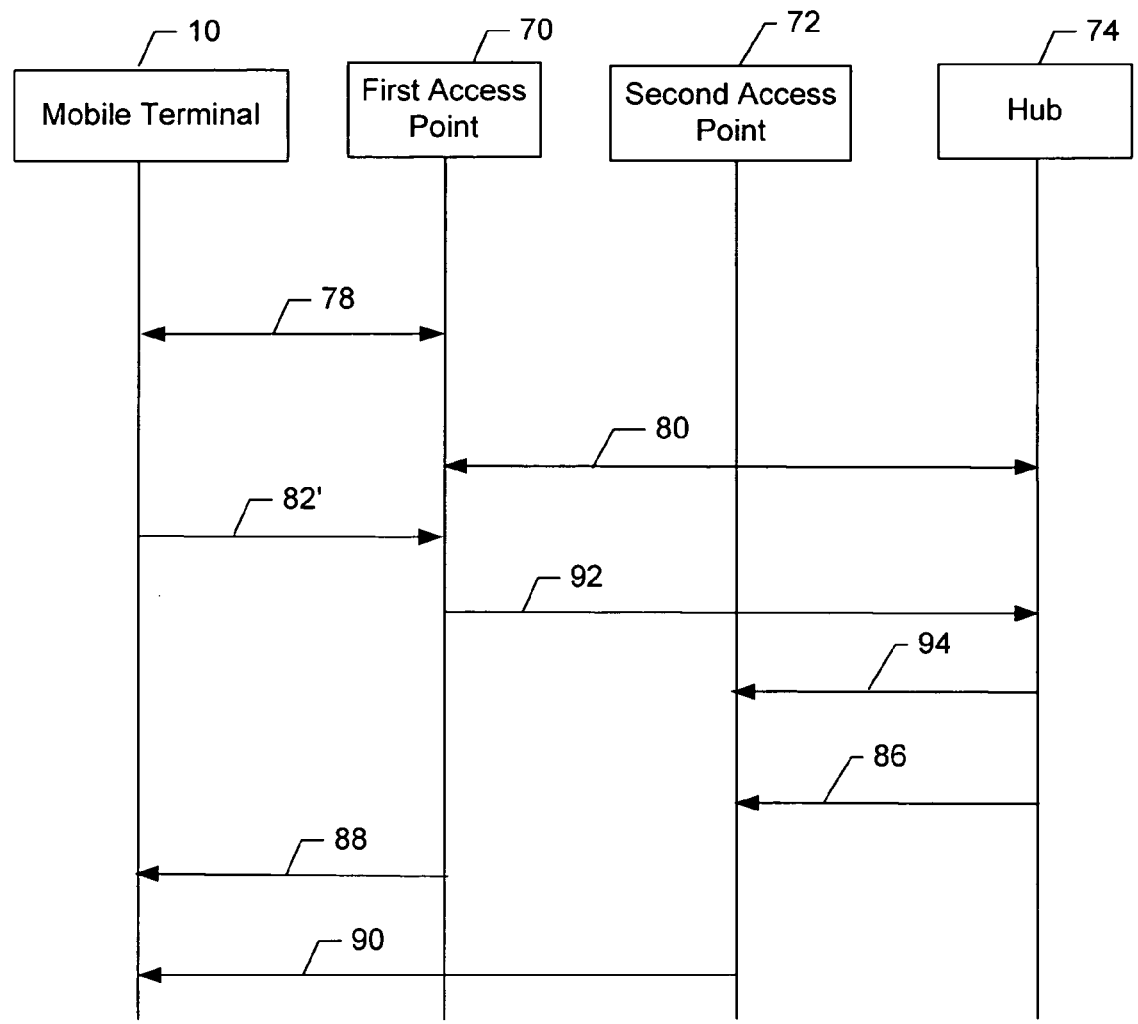
FIG. 5 illustrates a control flow diagram illustrating a method of reduction of data loss during switching association of a mobile terminal between network access points according to another exemplary embodiment of the present invention.

In another exemplary embodiment as shown in FIG. 5, the same procedure as described above occurs, except that an intention to transfer message 82' is sent from the mobile terminal to the first access point 70. The first access point 70 then relays the intention to transfer message to the hub 74 in the form of a request to divert data to the second access point 72 as indicated by arrow 92. The hub 74 then delivers the intention to transfer message to the second access point 72 as indicated by arrow 94. The hub 74, then begins directing data intended for the mobile terminal 10 to the second access point 72 as indicated by arrow 86. However, the mobile terminal 10 remains in communication with the first access point 70 for either a predetermined amount of time or long enough to ensure all queued data has been delivered to the mobile terminal 10 as indicated by arrow 88. During the time which the mobile terminal 10 remains in communication with the first access point 70, the second access point 72 stores new data that arrives from the hub 74, which is intended for the mobile terminal 10. After the mobile terminal 10 has waited the predetermined amount of time or received all queued data from the first access point 70, the mobile terminal 10 transitions to the second access point 72 and so notifies the second access point 72. After transitioning, the second access point 72 delivers all stored data and any new data that arrives to the mobile terminal 10 as indicated by arrow 90.

Figure 6:
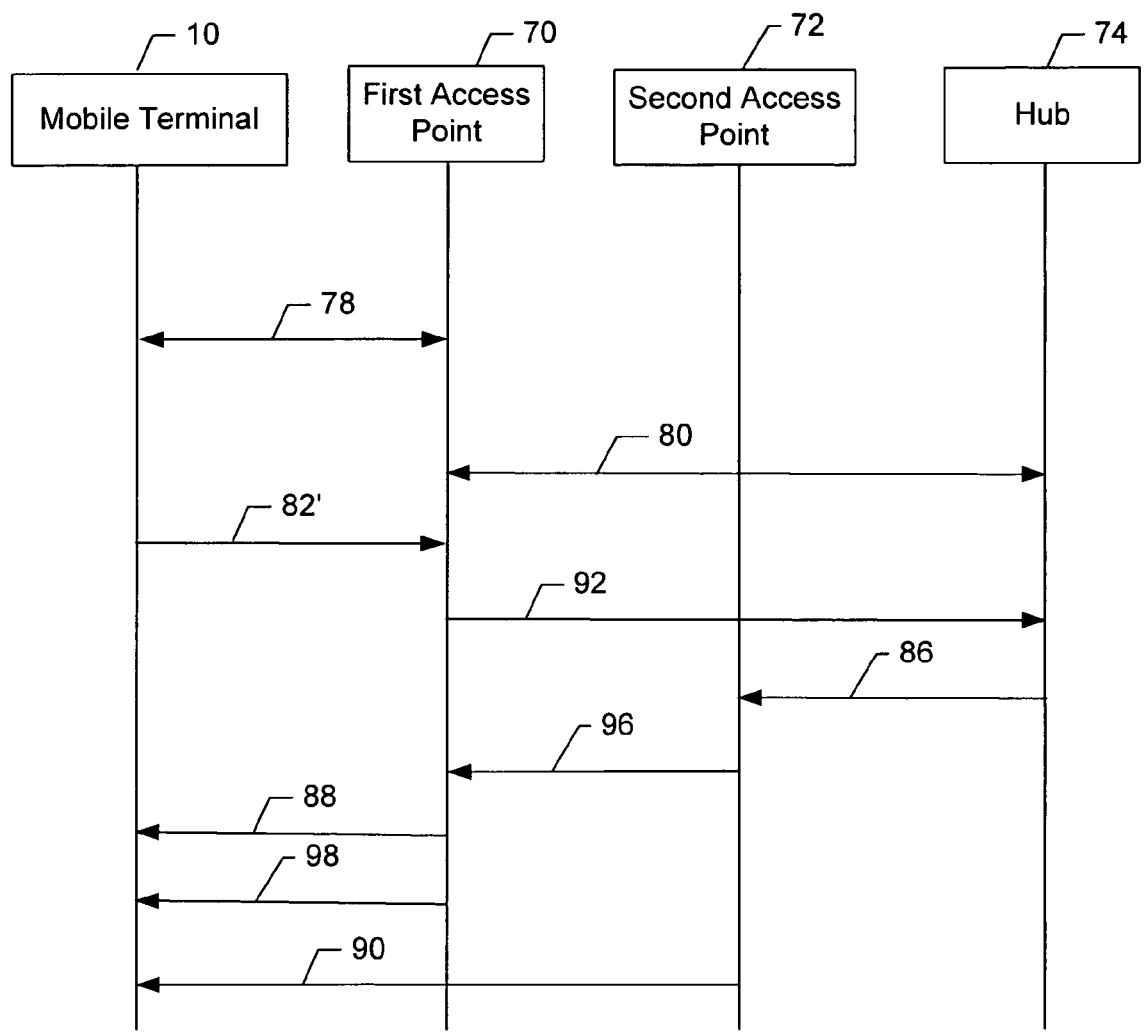
FIG. 6 illustrates a control flow diagram illustrating a method of reduction of data loss during switching association of a mobile terminal between network access points according to yet another exemplary embodiment of the present invention.

In yet another exemplary embodiment as shown in FIG. 6, the same procedure as those described above is followed, except that upon receipt of the intention to transfer message 82 or 82' by the second access point 72 or the first access point 70, respectively, after requesting the hub 74 to divert data to the second access point 72 as indicated by arrow 92, and after the hub 74 begins directing data intended for the mobile terminal 10 to the second access point 72 as indicated by arrow 86, the second access point 72 sends a confirmation message 96 to the first access point 70 via the hub 74 confirming that it has started accepting data. However, the mobile terminal 10 remains in communication with the first access point 70 long enough to ensure all queued data from the first access point 70 has been delivered to the mobile terminal 10 as indicated by arrow 88. During the time which the mobile terminal 10 remains in communication with the first access point 70, the second access point 72 stores new data that arrives from the hub 74, which is intended for the mobile terminal 10. Following receipt of the confirmation message 96, the first access point 70 sends a clearance message 98 to the mobile terminal 10 when all the queued data at the first access point 70 has been delivered to the mobile terminal 10, thereby enabling the mobile terminal 10 to immediately transition to the second access point 72 and so notifies the second access point 72. After transitioning, the second access point 72 delivers all stored data and any new data that arrives to the mobile terminal 10 as indicated by arrow 90. It should be noted that although FIG. 6 illustrates a modification of the procedure explained in reference to FIG. 5, the procedure explained in reference to FIG. 4 may also be modified as expressed above.

In still another exemplary embodiment of the present invention, first and second access points 70 and 72 and the mobile terminal 10 are devices conforming to the IEEE802.11 standard for wireless LAN. In this case, the mobile terminal 10 is initially associated with the first access point 70 as described above. When transition is imminent, the mobile terminal 10 sends the intention to transfer message 82 via the first access point 70 addressed to second access point 72. When the second access point 72 receives the intention to transfer message 82, the second access point 72 issues an update message 100 to the hub 74. The hub 74, then begins directing data intended for the mobile terminal 10 to the second access point 72 as indicated by arrow 86. The second access point 72 then sends a switch confirmation message 102 to the first access point 70 indicating that the second access point 72 has started receiving data. During this transition period, the mobile terminal 10 must cease to send any data to the first access point 70 although it continues to receive data from the first access point 70 as indicated by arrow 88. Following receipt by the first access point 70 of the switch confirmation message 102 from second access point 72, the first access point 70 issues a notification message 104, such as a de-associate message, to the mobile terminal 10 and the mobile terminal 10 then immediately associates with the second access point 72. After the mobile terminal 10 associates with the second access point 72, the second access point 72 then forwards any stored data to the mobile terminal 10 and the mobile terminal 10 resumes transmissions to the second access point 72 as indicated by arrow 90' along with receipt of new data.

In an exemplary embodiment, the intention to transfer message 82 or 82' may be expressed as a request to transition (RTT) message. For example, the RTT message may include a fast transition (FT) RTT action frame. The FT RTT informs the network that an original access point is preparing to transition to a target access point and wishes to receive all pending frames prior to the transition. The FT RTT may include an identity of both the original and target access points, a time interval information element (TIE), a fast transition information element (FTIE), an encapsulated EAPOL-Key frame (EAPKIE) and other elements. The TIE expresses a re-association deadline time, if any. In other words, the TIE sets the predetermined amount of time which the mobile terminal 10 waits prior to associating with the target access point. The EAPKIE includes nonce values and other information elements used for authentication of a RTT.

In an exemplary embodiment, the de-associate message 104 or the clearance message 98 may be expressed as a clear to transition message (CTT). For example, the CTT message may include a fast transition (FT) CTT action frame. The FT CTT informs the mobile terminal 10 that all queued frames have been delivered by the original access point and that the original access point has received notification from the target access point that association with the target access point is complete. The FT CTT may include the identity of both the original and target access points, the TIE, the FTIE, the EAPKIE and other elements.

FIG. 8 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal 10, the first and second access points 70 and 72 and the hub 74 and executed by a built-in processor in each of the above elements. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for proactive, early network switching includes transmitting a request to transition message at operation 200. Queued data from an original access point is received at operation 210. The queued data may be received for either a predetermined time or until all such data is received as indicated by, for example, by a message indicating that the mobile terminal is clear to transition. During this time, data from the original access point is received by the mobile terminal 10, but no data is transmitted from the mobile terminal 10 to the original access point. At operation 220, a transition is conducted from the original access point to a target access point. At operation 230, data which was stored at the target access point responsive to receipt of the intention to transition message is received at the mobile terminal 10 following the transition. At operation 240, the mobile terminal 10 completes association with the target access point and resumes transmission to the target access point, in addition to receiving transmissions from the target access point. Accordingly, data is not lost while transitioning from the original access point to the target access point.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and a memory including computer program code, the memory and the computer program code configured to, with the processor, cause the apparatus to: control transmitting a request to transition the apparatus from communication with an original network device to communication with a target network device, control receiving queued data directly from the original network device during a period starting from transmission of the request to transition and ending at the transition, the queued data being content data intended for and undelivered to the apparatus by the original network device when the request is transmitted; control transitioning the apparatus from the original network device to the target network device after receipt of the queued data from the original network device, and receiving data stored at the target network device following transition; and control receiving a message from the original network device, the message indicating clearance for the apparatus to transition to the target network device, the apparatus transitioning responsive to receipt of the message.

2. The apparatus of claim 1, wherein the message is received in response to elapse of a predetermined period of time.

3. The apparatus of claim 1, wherein the message is received in response to receipt of all queued data from the original network device.

4. The apparatus of claim 1, wherein the request to transition includes instructions for terminating transmission to the original network device.

5. The apparatus of claim 1, wherein the apparatus is configured to begin transmission to the target network device responsive to receipt of the message.

6. The apparatus of claim 1, wherein the request to transition is transmitted to the original network device.

7. The apparatus of claim 1, wherein the request to transition is transmitted to the target network device.

8. The apparatus of claim 1, wherein the request to transition is transmitted to the target network device via the original network device using information containing an address of the target network device.

9. An apparatus comprising a processor and a memory including computer program code, the memory and the computer program code configured to, with the processor, cause the apparatus to: control receiving and relaying a request from a mobile terminal to transition from the apparatus to another network device, control transmitting queued data from the apparatus directly to the mobile terminal responsive to the request to transition, the queued data being content data intended for and undelivered to the mobile terminal by the apparatus when the request is transmitted, the queued data being delivered to the mobile terminal during a period starting from transmission of the request to transition and ending at the transition, and control transmitting a clearance message to the mobile terminal for transitioning, to indicate that all of the queued data has been delivered to the mobile terminal.

10. The apparatus of claim 9, wherein the apparatus is further configured to receive a message from another network device in response to receipt of data from a network source subsequent to receiving the request to transition.

11. A computer program product comprising at least one non-transitory computer-readable storage medium having computer-readable program code portions stored therein, the computer-readable program code portions comprising: a first executable portion for transmitting a request to transition a mobile terminal from communication with an original network device to communication with a target network device; a second executable portion for receiving, at the mobile terminal, queued data directly from the original network device during a period starting from transmission of the request to transition and ending at the transition, the queued data being content data intended for and undelivered to the mobile terminal by the original network device when the request is transmitted; a third executable portion for transitioning from the original network device to the target network device after receipt by the mobile terminal of the queued data from the original network device; a fourth executable portion for receiving data stored at the target network device following transition; and a fifth executable portion for receiving a message from the original network device, the message indicating clearance for the mobile terminal to transition to the target network device, the third executable portion executing responsive to receipt of the message.

12. The computer program product of claim 11, wherein the fifth executable portion is executed responsive to elapse of a predetermined period of time.

13. The computer program product of claim 11, wherein the fifth executable portion is executed responsive to receipt of all queued data from the original network device.

14. The computer program product of claim 11, wherein the second executable portion comprises instructions for terminating transmission to the original network device responsive to transmission of the request to transition, and the fourth executable portion comprises instructions for beginning transmission to the target network device responsive to receipt of the message.

15. A method comprising: controlling transmission, from a mobile terminal, of a request to transition the mobile terminal from communication with an original network device to communication with a target network device; receiving, at the mobile terminal, queued data directly from the original network device during a period starting from transmission of the request to transition and ending at the transition, the queued data being content data intended for and undelivered to the mobile terminal by the original network device when the request is transmitted; controlling, by the mobile terminal, transition from the original network device to the target network device following receipt by the mobile terminal of the queued data from the original network device; receiving, at the mobile terminal, data stored at the target network device following transition; and receiving a message from the original network device, the message indicating clearance to transition to the target network device, and the transitioning from the original network device to the target network device occurring responsive to receipt of the message.

16. A computer program product comprising at least one non-transitory; computer-readable storage medium having computer-readable program code portions stored therein, the computer-readable program code portions comprising: a first executable portion for receiving, at a network access point, a request from a mobile terminal to transition from the network access point to another network access point; a second executable portion for relaying the request to transition from the network access point to a network device; a third executable portion for transmitting, by the network access point, queued data previously received from the network device directly to the mobile terminal responsive to the request to transition during a period starting from transmission of the request to transition and ending at the transition, the queued data being content data intended for and undelivered to the mobile terminal by the network access point when the request is transmitted; and a fourth executable portion for transmitting a clearance message to the mobile terminal for transitioning, to indicate that all of the queued data has been delivered to the mobile terminal.

17. The computer program product of claim 16, further comprising a fourth executable portion for receiving a message from the other network access point indicating receipt of data from the network device following receipt of the request to transition.

18. A system comprising: a network source configured to enable communication with a third party device; an original network device configured to enable communication with the network source; a target network device configured to enable communication with the network source; and a mobile terminal configured to enable wireless communication with either of the original and target network devices, the mobile terminal being configured to transmit a request to transition from the original network device to the target network device, wherein at least one of the original and target network devices is configured to transmit notification of the request to the network source, and the network source is configured to switch transmission of data to the target network device in response to the notification, wherein the original network device is configured to provide queued data directly to the mobile terminal during a period starting from transmission of the request to transition and ending at the transition and the target network device is configured to store data received from the network source after the request but prior to transition of the mobile terminal to the target network device, the queued data being content data intended for and undelivered to the mobile terminal by the original network device when the request is transmitted, and wherein the mobile terminal is configured to receive a message from the original network device, the message indicating clearance for the apparatus to transition to the target network device, the apparatus transitioning responsive to receipt of the message.

19. The system of claim 18, wherein the mobile terminal is configured to transition from the original network device to the target network device following one of: elapse of a predetermined time; and receipt of all of the queued data.

* * * * *